United States Patent
Rollins

(10) Patent No.: US 6,738,348 B1
(45) Date of Patent: May 18, 2004

(54) BANDWIDTH ON DEMAND SUBSCRIBER SYSTEM

(75) Inventor: Douglas L. Rollins, Nampa, ID (US)

(73) Assignee: Interland, Inc., Atlanta, GA (US)

( * ) Notice: Subject to any disclaimer, the term of this patent is extended or adjusted under 35 U.S.C. 154(b) by 0 days.

(21) Appl. No.: 09/491,018

(22) Filed: Jan. 25, 2000

(51) Int. Cl.[7] .............................................. G01R 31/08
(52) U.S. Cl. .................................. 370/230; 379/114.01
(58) Field of Search ................................ 370/229, 233, 370/234, 238, 252, 351; 379/114.01, 114.02, 114.03, 114.05, 114.06, 114.07, 114.08, 114.09, 114.1

(56) References Cited

U.S. PATENT DOCUMENTS

| | | | |
|---|---|---|---|
| 5,280,470 A | * 1/1994 | Buhrke et al. | 370/232 |
| 5,359,593 A | * 10/1994 | Derby et al. | 370/234 |
| 5,680,390 A | * 10/1997 | Robrock, II | 370/229 |
| 6,055,571 A | * 4/2000 | Fulp et al. | 709/224 |
| 6,230,203 B1 | * 5/2001 | Koperda et al. | 709/229 |

* cited by examiner

Primary Examiner—David Vincent
(74) Attorney, Agent, or Firm—Trop, Pruner & Hu, P.C.

(57) ABSTRACT

A system includes a client subsystem and a network service provider subsystem that is coupled to the client subsystem. The network service provider subsystem is adapted to establish a connection between the network service provider subsystem and the client subsystem. The connection has an allocated bandwidth. The network service provider subsystem is further adapted to during the connection, receive a request from the client subsystem to increase the allocated bandwidth and selectively increase the allocated bandwidth in response to the request during the connection.

24 Claims, 4 Drawing Sheets

BANDWIDTH ON DEMAND SUBSCRIBER SYSTEM

BACKGROUND

The invention relates to a bandwidth on demand subscriber system.

For purposes of accessing the Internet, a computer user may subscribe to a broadband service, such as a Digital Subscriber Line (DSL) or a satellite service, as examples. Current broadband services offer several bandwidth options for the subscriber. Each option typically has a fixed price and is associated with a maximum, or allocated, bandwidth, and the higher the allocated bandwidth, the higher the price of the subscription. The above-described billing arrangement may lead a subscriber to pay for more service than the subscriber actually uses on a regular basis, as the allocated bandwidth is fixed when the subscriber connects to the service, and changing the subscription option between connections may involve a lengthy upgrade/downgrade process.

As an example, an Asymmetric Digital Subscriber Line (ADSL) service typically has several bandwidth options, such as an option that provides up to a 128 kilobytes per second (kb/s) bandwidth for uploads and up to a 384 kb/s bandwidth for downloads. Another higher bandwidth option may be, for example, an option that provides up to a 1.5 Megabyte/second (Mb/s) bandwidth for uploads and up to a 7.1 Mb/s bandwidth for downloads. Even with the different options, a subscriber may pay for more service than the subscriber actually needs. For example, a subscriber may need only a 128 Kb/s upload bandwidth allocation and a 384 Kb/s download bandwidth allocation most of the time and may need higher bandwidth allocations infrequently. However, the subscriber may still subscribe to a more expensive option that has higher bandwidth allocations to reserve the additional bandwidth for the few times in which the additional bandwidth is needed.

Thus, there is a continuing need for an arrangement that addresses one or more of the problems that are stated above.

SUMMARY

In an embodiment of the invention, a method includes establishing a connection between a network service provider subsystem and a client subsystem. The connection has an allocated bandwidth. During the connection, a request is received from the client subsystem to increase the allocated bandwidth, and during the connection, the allocated bandwidth is selectively increased in response to request.

In another embodiment of the invention, a system includes a client subsystem and a network service provider subsystem that is coupled to the client subsystem. The network service provider subsystem is adapted to establish a connection between the network service provider subsystem and the client subsystem. The connection has an allocated bandwidth. The network service provider subsystem is further adapted to during the connection, receive a request from the client subsystem to increase the allocated bandwidth and selectively increase the allocated bandwidth in response to the request during the connection.

In yet another embodiment of the invention, a system includes a network provider subsystem and a client subsystem. The client subsystem is adapted to establish a connection with the network provider subsystem. A network is coupled to the network provider subsystem and the client subsystem. The network is adapted to establish an allocated bandwidth of the connection; during the connection, receive a request from the network provider subsystem to increase the allocated bandwidth; and during the connection, selectively increase the allocated bandwidth in response to the request.

Advantages and other features of the invention will become apparent from the following description, from the drawing and from the claims.

DETAILED DESCRIPTION

Figure 1:
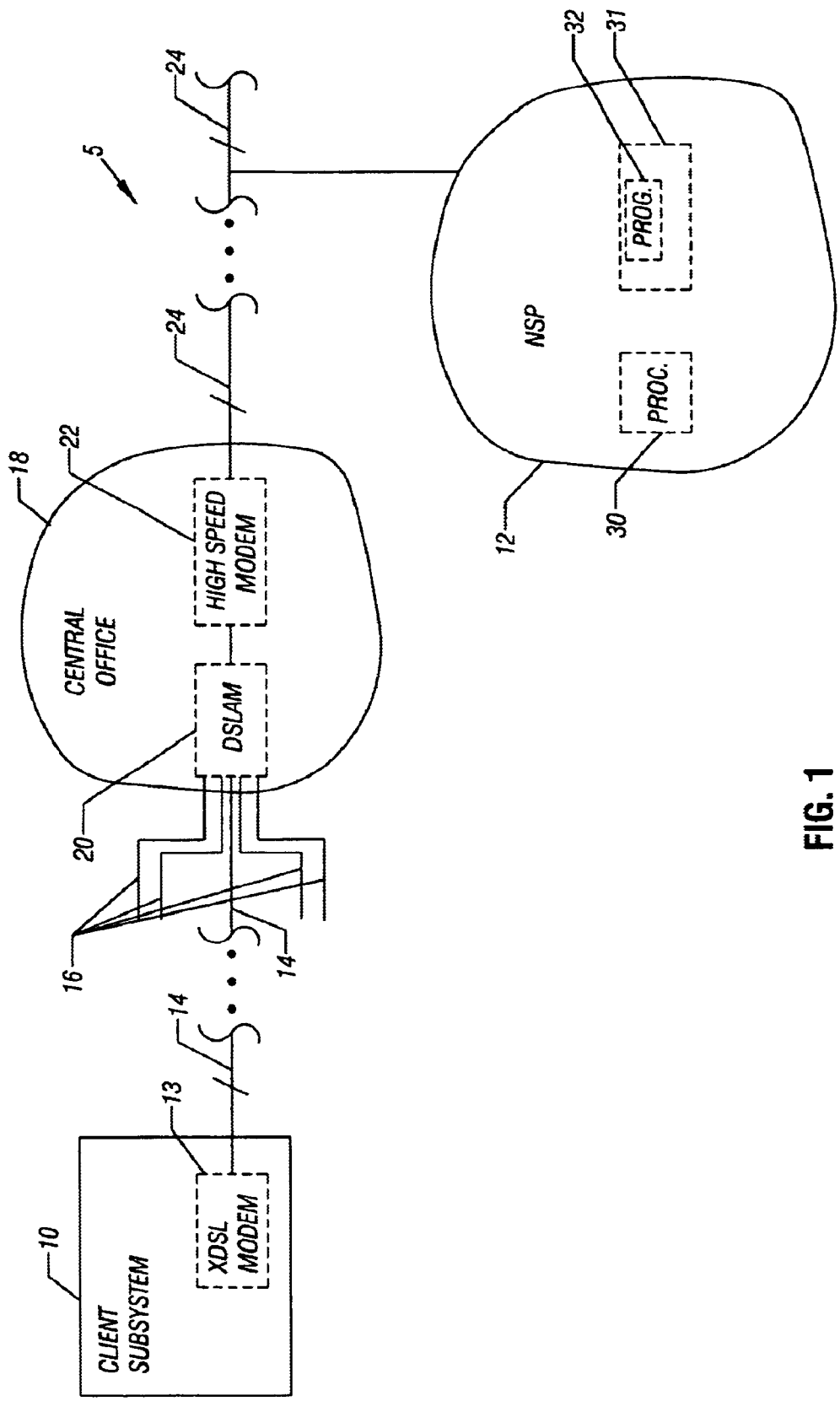
FIG. 1 is a schematic diagram of a telephony system according to an embodiment of the invention.

Referring to FIG. 1, an embodiment 5 of a telephony system in accordance with the invention includes a client subsystem 10 that may establish a connection with a network service provider subsystem (called "NSP") 12 to receive a service from the NSP 12. As an example, the NSP 12 may be an Internet service provider (ISP) that provides Internet access, and the client subsystem 10 may be a home or an office computer system. Of course, other types of network service providers and client subsystems are possible.

Unlike conventional arrangements, the connection between the client subsystem 10 and the NSP 12 is not limited to a maximum, or allocated, bandwidth to which the client subsystem 10 subscribes prior to its current connection with the NSP 12. Instead, the telephony system 5 is constructed (as described below) to allow the client subsystem 10 to increase the allocated bandwidth between the client subsystem 10 and the NSP 12 during a particular connection. Thus, for example, if a user of the client subsystem 10 desires to temporarily increase the allocated bandwidth without permanently changing the user's subscription option or disconnecting from the NSP 12, the user may (via the client subsystem 10) submit a request through the telephony system 5 to temporarily increase the allocated bandwidth. Likewise, when the user no longer needs the increased bandwidth allocation, the user may (via the client subsystem 10) submit another request during the current connection to restore the allocated bandwidth to the level that is established by the user's subscription option.

Thus, for the above-described scenario, the user's account may be billed based on a two level fee schedule (as an example): a flat fee (a flat fee per month, for example) based on the subscription option and a time rate-based surcharge (in addition to the flat fee) based on the time in which the subscribed bandwidth allocation is increased. For example, the surcharge may be computed by multiplying a predetermined surcharge rate by the time in which the allocated bandwidth is increased. The surcharge rate may be based on, for example, the amount of increase in the bandwidth allocation. Thus, in some embodiments, a higher increase in bandwidth allocation may be associated with a higher surcharge rate.

As an example, the client subsystem 10 may be used by a salesperson to electronically transfer catalogs (requiring a large bandwidth) from a manufacturer. For this application, the salesperson (i.e., the user of the client subsystem 10) may log onto the manufacturer's Internet website, submit an request to temporarily increase the allocated bandwidth that is established by the subscription option, download electronic copies of the catalogs from the website and then submit a request to restore the allocated bandwidth to its original level. For the time in which the bandwidth allocation was increased, the NSP 12 and/or a central office 18 (of the telephony subscriber system 5) may bill the user's account a surcharge based on the duration of this time. However, a permanent change in the subscription option is not required. Thus, the account is not charged a premium to reserve a large amount of unused bandwidth.

The telephony system 5 forms a network for communicating information between the client subsystem 10 and the NSP 12. In this manner, the telephony system 5 includes the central office 18 and other components (described below) that form the network. However, in other embodiments of the invention, the network may be formed from a system that does not include a telephony system. For example, a cable-based television system as well as a satellite-based system may be used to form the network that establishes a connection between the client subsystem 10 and the NSP. Furthermore, a mixture of the above-described systems may be used to form the network. For example, the client subsystem 10 may upload information to the NSP 12 via the telephony system 5 and download information from the NSP 12 via a satellite system. Other arrangements are possible and are within the scope of the appended claims.

For embodiments where the telephony system 5 may be used, the telephony system 5 may include a high speed link, such as a Digital Subscriber Line (DSL) 14, to communicate information between the client subsystem 10 and the central office 18 of the telephony system 5. As examples, the DSL line 14 may be an asymmetric DSL (ADSL), a high bit-rate DSL (HDSL) or a single-line DSL (SDSL), as just a few examples. To communicate with the DSL 14, the client subsystem 10 may include a DSL modem 13. The central office 18 may be associated with an incumbent local exchange carrier (ILEC) or a competitive local exchange carrier (CLEC), as examples.

The central office 18 communicates with not only the DSL line 14 from the client subsystem 10 but other DSL lines 16 that are routed inside the central office 18 to a Digital Subscriber Line Access Multiplexer (DSLAM) 20. The DSLAM 20, in turn, communicates the information between the DSL lines 14 and 16 and a high speed communication link that is coupled to the NSP 12. For example, in some embodiments of the invention, the DSLAM 20 links the DSL lines 14 and 16 to a high speed modem 22 that communicates with, for example, an asynchronous transfer mode (ATM) line 24 that is coupled to the NSP 12 and provides communication speeds up to one Giga bits per second (Gb/s) (for example).

Figure 2:
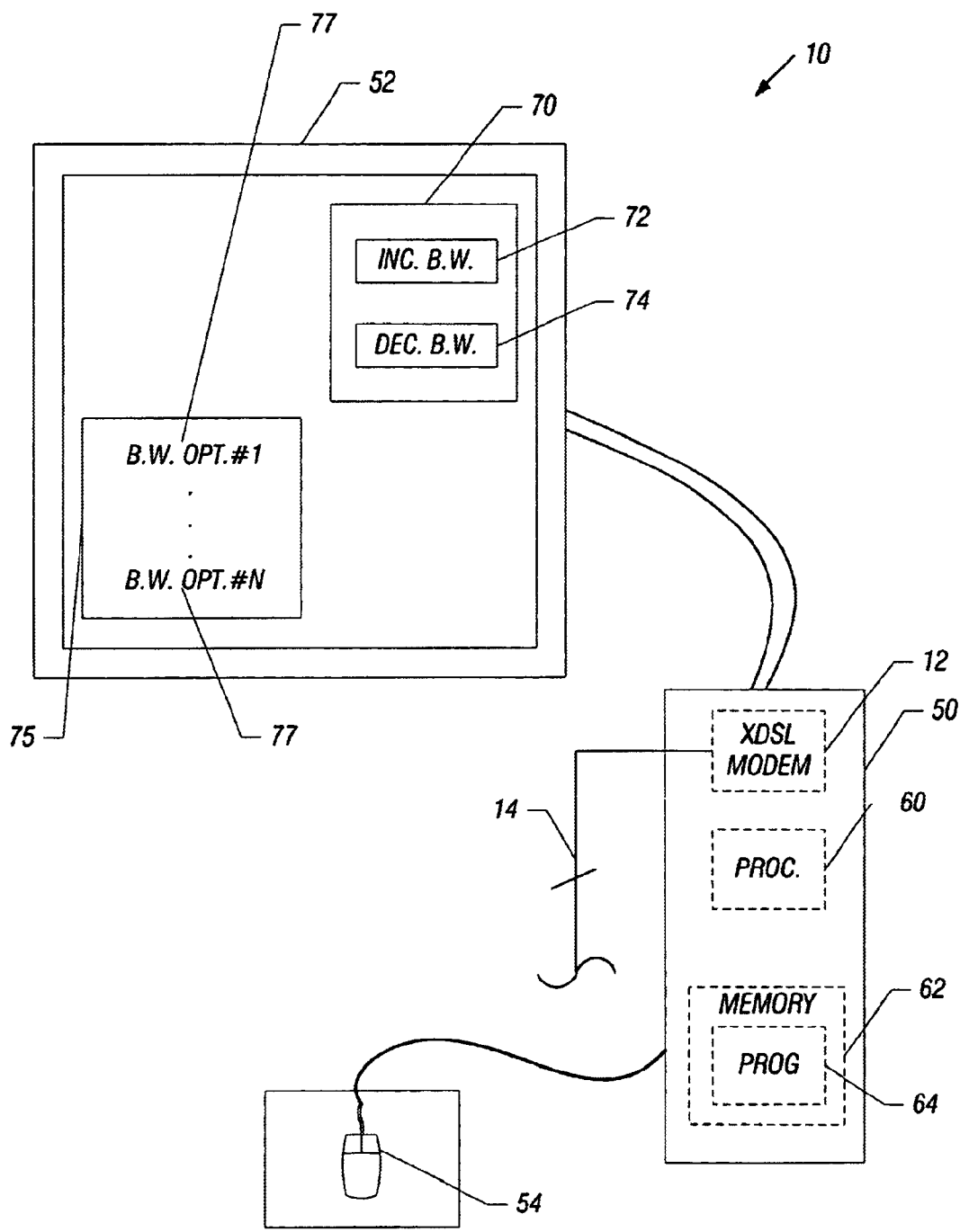
FIG. 2 is a schematic diagram of a client subsystem of the telephony system of FIG. 1 according to an embodiment of the invention.

Referring to FIG. 2, in some embodiments, the client subsystem 10 may include a personal computer that includes a computer base unit 50 (that includes the motherboard, disk drives, etc.) and a display 52. Once connected to the NSP 12, a user of the client subsystem 10 may desire to increase the allocated bandwidth of the subscription. To accomplish this, the user may use a mouse 54, for example, to "click" on an "increase bandwidth" graphical icon 72 (present in a window 70 on the display 52), an event that causes the client subsystem 10 to generate the appropriate signals on the DSL 14 to submit a request to the NSP 12 to increase the allocated bandwidth. As described below, in some embodiments, the NSP 12 evaluates the request to determine the different increased bandwidth options, if any, are possible, and communicate signals to the ATM line 24 to provide this information to the client subsystem 10. The client subsystem 10 then displays the bandwidth option selections 77 (assuming an increased bandwidth option is available) in a window 75 of the display 52. In this manner, the user may use the mouse 54 to select the new allocated bandwidth from the selections 77. Once selected, the client subsystem 10 generates the appropriate signals on the DSL 14 to communicate the request to the NSP 12 to set the new allocated bandwidth at the specified level.

When the user no longer desires to use the new allocated bandwidth (and thus, does not desire to be billed at the surcharge rate), the user may use the mouse 54 to "click" on a "restore bandwidth" graphical icon 74 (on the display 52) to restore the allocated bandwidth to the bandwidth that is specified by the subscription option. In this manner, the client subsystem 10 generates the appropriate signals on the DSL 14 to communicate the restore request to the NSP 12. The above-described technique of increasing and/or restoring the allocated bandwidth depicts one of many possible embodiments of the invention.

The base unit 50 may include the DSL modem 13 and a processor 60 (a microprocessor, for example) that executes a program 64 (stored in a memory 62 of the base unit 50) to cause the processor 60 to submit requests to the NSP 12 to increase the allocated bandwidth and restore the allocated bandwidth to the original level.

Figure 3:
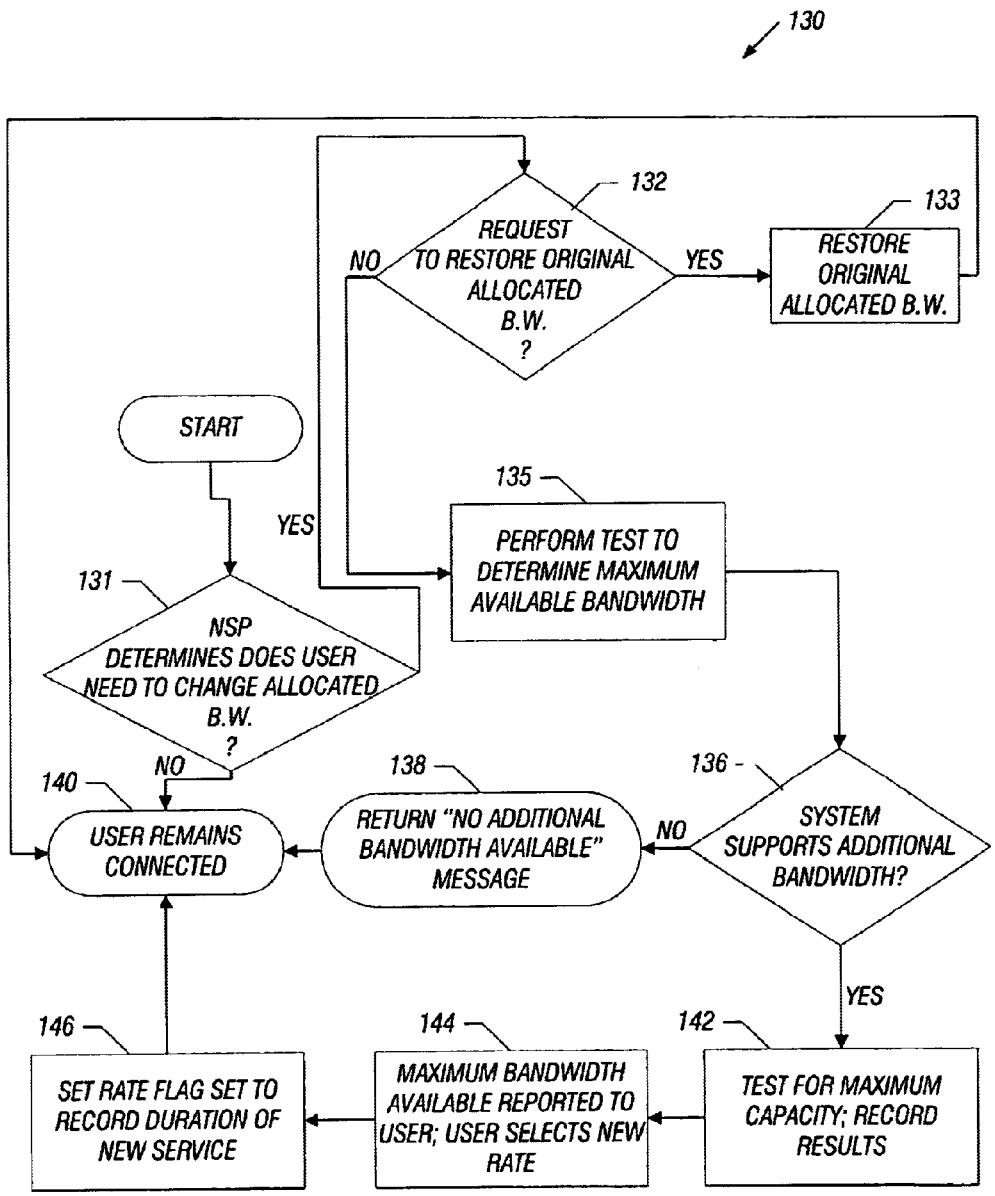
FIGS. 3 and 4 depict flow diagrams illustrating techniques to adjust an allocated bandwidth between the client subsystem and a network service provider subsystem of the telephony system of FIG. 1 according to different embodiments of the invention.

The regulation of the allocated bandwidth and its associated billing may be controlled, depending on the particular embodiment of the invention, by a connectivity service (such as the service provided by the NSP 12), a carrier service (the service provided by the central office 18, for example) or both. When a connectivity service provides and bills for the maximum allocated bandwidth, a technique 130 that is depicted in FIG. 3 may be used in some embodiments.

As an example, the NSP 12 may include a computer that includes a processor 30 (a microprocessor, for example (see FIG. 1)) that executes a program 32 that is stored in a memory 31 to cause the computer to perform the technique 130. As examples, a copy of the program 32 may be stored on a storage medium, such as a hard disk drive, a floppy diskette, a CD-ROM diskette or a DVD diskette, as just a few examples. Furthermore, the copy of the program 32 may be distributed over more than one storage medium. For example, a portion of the program 32 may be stored on one CD-ROM diskette, and the remaining portion of the program 32 may be stored on another CD-ROM diskette.

In some embodiments, the technique 130 may include the NSP 12 determining (diamond 131) whether the user has submitted a request to change the allocated bandwidth. If so, the NSP 12 determines (diamond 132) whether the request is to restore the allocated bandwidth back to the original subscribed allocated bandwidth, and if so the NSP 12 restores the allocated bandwidth, as indicated in block 133. Otherwise, if the NSP 12 determines (diamond 132) that the request is to increase the allocated bandwidth, the NSP 12 performs (block 135) a test to determine the maximum available bandwidth. Based on this test, if the NSP 12 determines (diamond 136) that the NSP 12 and the telephony system 5 is capable of supporting additional bandwidth, then the NSP 12 tests (block 142) for the maximum capacity and records the results. The NSP 12 then reports (block 144) the maximum bandwidth that is available to the user to permit the user to select the new allocated bandwidth. If the NSP 12 determines (diamond 136) that the NSP 12 and the telephony system 5 is not capable of supporting additional bandwidth, then the NSP 12 returns (block 138) a "no additional bandwidth available" message to the client subsystem 10.

Alternatively, in some embodiments, instead of indicating the absolute bandwidth that is desired, the client subsystem 10 may transmit a request to increase the available bandwidth by an incremental amount. For example, each time the user clicks on the increase bandwidth icon 72 (see FIG. 2), a request may be communicated to the NSP 12 to increase the allocated bandwidth by a predetermined amount, such as 64 kb/s, for example. It is noted that the client subsystem 10 may use the techniques described herein to increase the allocated bandwidth for uploads, increase the allocated bandwidth for downloads, or increase the allocated bandwidths for both uploads and downloads in accordance with different embodiments of the invention.

After the NSP 12 establishes the new allocated bandwidth, the NSP 12 sets (block 146) a rate flag to record the duration of the upgraded service. Control returns from the block 138 or 146 to a block 140 that depicts the user (and thus, the client subsystem 10) remaining connected to the NSP 12.

In some embodiments, the central office 18 may allocate the additional bandwidth. More particularly, the NSP 12 may receive a request from the user to increase the allocated bandwidth, and in response, communicate with the central office 18 to increase the allocated bandwidth. Depending on the particular embodiment, the central office 18 may bill the NSP 12 a time rate-based surcharge during the time in which bandwidth allocation was increased and thus, the NSP 12 may bill the surcharge to the user's account; or alternatively, the central office 18 may directly bill the surcharge to an account of the user.

Figure 4:
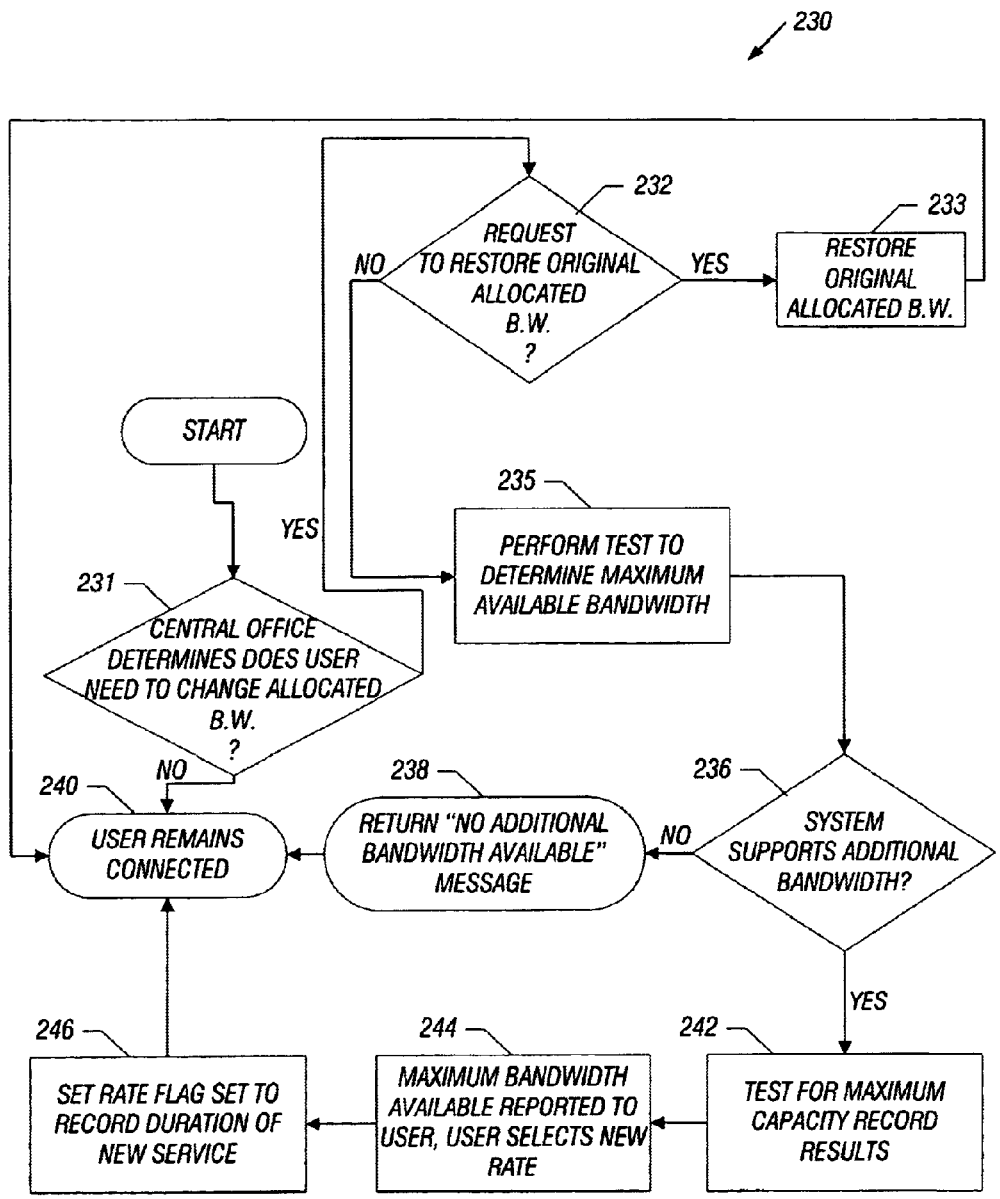

In this manner, in some embodiments, the central office 18 may perform a technique 230 that is depicted in FIG. 4. The central office 18 may determine (diamond 231) whether the NSP 12 has submitted a request to change the allocated bandwidth (in response to a request from the user). If so, the central office 18 determines (diamond 232) whether the request is to restore the allocated bandwidth to a previous amount, and if so, the central office 18 restores the allocated bandwidth, as depicted in block 233. Otherwise, if the central office 18 determines (diamond 232) that the request is to increase the allocated bandwidth, the central office 18 performs (block 235) a test to determine the maximum available bandwidth.

If the central office 18 determines (diamond 236) that the telephony system 5 is capable of supporting additional bandwidth, then the central office 18 tests (block 242) for the maximum capacity and records the results. The central office 18 then reports (block 244) the maximum bandwidth that is available to the NSP 12 that relays this information to the user. After the central office 18 establishes the new allocated bandwidth, the NSP 12 sets (block 246) a rate flag to record the duration of the upgraded service. As an example, the central office 18 may bill the NSP 12 for the increased bandwidth, and the NSP 12 may pass this charge along to the user.

If the central office 18 determines (diamond 236) that no additional bandwidth is available, then the central office 18 returns (block 238) a "no additional bandwidth available" message to the NSP 12 that, in turn, relays this message to the user. Control passes from the block 238 or 246 to block 240 that depicts the user remaining connected to the NSP 12. As noted above, the client subsystem 10 may communicate requests to increase the bandwidth by incremental or absolute amounts.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   establishing a connection between a network service provider subsystem and a client subsystem, the connection having an allocated bandwidth;
   during a period of time that the connection is in place, receiving a request from the client subsystem to increase the allocated bandwidth;
   during the period of time that the connection is in place, selectively increasing the allocated bandwidth in response to the request; and
   charging an account associated with the client subsystem based on whether the allocated bandwidth is increased, wherein the charging comprises charging the account a flat fee and charging the account an additional time rate-based fee during a time in which the allocated bandwidth is increased.

2. The method of claim 1, further comprising:
   receiving another request from the client subsystem to restore the allocated bandwidth to a bandwidth associated with a subscription option; and
   restoring the allocated bandwidth in response to said another request.

3. The method of claim 1, wherein the selectively increasing comprises:
   testing a maximum bandwidth capacity of the connection; and
   increasing the allocated bandwidth in response to the request if the maximum bandwidth capacity is greater than the allocated bandwidth.

4. The method of claim 1, wherein the network service provider subsystem comprises:
   an Internet service provider subsystem.

5. The method of claim 1, wherein the request indicates an absolute value for the allocated bandwidth.

6. The method of claim 1, wherein the request indicates a value by which to incrementally increase the allocated bandwidth.

7. The method of claim 1, wherein the selectively increasing is performed at least in part by a local exchange carrier.

8. The method of claim 1, wherein the selectively increasing is performed at least in part by the network service provider.

9. A system comprising:
   a client subsystem; and
   a network service provider subsystem coupled to the client subsystem to:
   establish a connection between the network service provider subsystem and the client subsystem, the connection having an allocated bandwidth,
   during a period of time that the connection is in place, receive a request from the client subsystem to increase the allocated bandwidth,
   selectively increase the allocated bandwidth in response to the request during the time that the connection is in place,
   charge an account associated with the client subsystem based on whether the account bandwidth is increased, and charge the account a flat fee and charge the account an additional time rate-based fee during a time in which the allocated bandwidth is increased.

10. The system of claim 9, wherein the network service provider subsystem receives another request from the client subsystem to restore the allocated bandwidth to a bandwidth associated with a subscription option and restores the allocated bandwidth in response to said another request.

11. The system of claim 9, wherein the network service provider subsystem:

tests a maximum bandwidth capacity of the connection; and increases the allocated bandwidth in response to the request if the maximum bandwidth capacity is greater than the allocated bandwidth.

12. The system of claim 9, wherein the network service provider subsystem comprises:

an Internet service provider subsystem.

13. The system of claim 9 comprising a telephony system.

14. The system of claim 9 comprising a satellite system.

15. The system of claim 9, comprising a cable television system.

16. A system comprising:

a network provider subsystem;

a client subsystem to establish a connection with the network provider subsystem; and a network coupled to the network provider subsystem and the client subsystem to:

establish an allocated bandwidth of the connection, during a period of time that the connection is in place, receive a request from the network provider subsystem to increase the allocated bandwidth, during the period of time that the connection is in place, selectively increase the allocated bandwidth in response to the request charge an account associated with the client subsystem based on whether the account bandwidth is increased, and charge the account a flat fee and charge the account an additional time rate-based fee during a time in which the allocated bandwidth is increased.

17. The system of claim 16, wherein the network receives another request from the network service provider subsystem to restore the allocated bandwidth to a bandwidth associated with a subscription option and restore the allocated bandwidth in response to said another request.

18. The system of claim 16, wherein the network:

tests a maximum bandwidth capacity of the connection, and increase increases the allocated bandwidth in response to the request if the maximum bandwidth capacity is greater than the allocated bandwidth.

19. The system of claim 16, wherein the network comprises a central office of a telephony network.

20. An article comprising at least one computer readable storage medium storing instructions to cause a computer to:

establish a connection between the network service provider subsystem and a client subsystem, the connection having an allocated bandwidth, during a period of time that the connection is in place, selectively increase the allocated bandwidth in response to a request from the client subsystem to increase the allocated bandwidth, charge an account associated with the client subsystem based on whether the allocated bandwidth is increased, and charge the account a flat fee and charge the account an additional time rate-based fee during a time in which the allocated bandwidth is increased.

21. The article of claim 20, wherein said at least one storage medium stores instructions to test a maximum bandwidth capacity of the connection and increase the allocated bandwidth in response to the request if the maximum bandwidth capacity is greater than the allocated bandwidth.

22. The article of claim 20, wherein the network service provider subsystem comprises:

an Internet service provider.

23. The article of claim 20, wherein the request indicates an absolute value for the allocated bandwidth.

24. The article of claim 20, wherein the request indicates a value by which to incrementally increase the allocated bandwidth.

* * * * *

UNITED STATES PATENT AND TRADEMARK OFFICE
CERTIFICATE OF CORRECTION

PATENT NO. : 6,738,348 B1
DATED : May 18, 2004
INVENTOR(S) : Douglas L. Rollins

It is certified that error appears in the above-identified patent and that said Letters Patent is hereby corrected as shown below:

Column 8,
Line 7, delete "increase".

Signed and Sealed this

Thirteenth Day of July, 2004

JON W. DUDAS
*Acting Director of the United States Patent and Trademark Office*